(12) United States Patent
Gu (10) Patent No.: US 9,995,984 B2
(45) Date of Patent: Jun. 12, 2018

(54) TRANSFLECTIVE LIQUID CRYSTAL DISPLAY DEVICE AND DRIVING METHOD THEREOF

(71) Applicant: BOE TECHNOLOGY GROUP CO., LTD., Beijing (CN)

(72) Inventor: Yaohui Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days. days.

(21) Appl. No.: 14/443,519

(22) PCT Filed: Sep. 30, 2014

(86) PCT No.: PCT/CN2014/087900
§ 371 (c)(1),
(2) Date: May 18, 2015

(87) PCT Pub. No.: WO2015/184713
PCT Pub. Date: Dec. 10, 2015

(65) Prior Publication Data
US 2015/0370117 A1    Dec. 24, 2015

(30) Foreign Application Priority Data

Jun. 4, 2014    (CN) .......................... 2014 1 0246005

(51) Int. Cl.
*G02F 1/1335*    (2006.01)
*G02F 1/137*    (2006.01)
(Continued)

(52) U.S. Cl.
CPC ........ *G02F 1/13731* (2013.01); *G02F 1/1393* (2013.01); *G02F 1/13439* (2013.01);
(Continued)

(58) Field of Classification Search
USPC .......... 349/12, 113, 114, 129, 130, 139, 141
See application file for complete search history.

(56) References Cited

U.S. PATENT DOCUMENTS 7,113,243 B2 *    9/2006    Jeong ................ G02F 1/134363
                                                                349/141
7,593,078 B2 *    9/2009    Ochiai ................ G02F 1/13306
                                                                349/114
(Continued)

FOREIGN PATENT DOCUMENTS

CN    1544978 A    11/2004
CN    1841135 A    10/2006
(Continued)

OTHER PUBLICATIONS

International Search Report dated Mar. 16, 2015; PCT/CN2014/087900.
(Continued)

*Primary Examiner* — Edward Glick
*Assistant Examiner* — David Chung
(74) *Attorney, Agent, or Firm* — Ladas & Parry LLP (57) ABSTRACT

Disclosed are a transflective liquid crystal display device and a driving method thereof. The transflective liquid crystal display device includes: a first surface electrode (103), a first pixel electrode (107), a second surface electrode (113) and a second pixel electrode (112) located in transmissive regions (A); the first surface electrode (103) and first pixel electrode (107) are located between a first substrate (102) and a liquid crystal layer (110), the second surface electrodes (113) and the second pixel electrodes (112) are located between a second substrate (104) and the liquid crystal layer (110). The device further includes: a third surface electrode (104), a reflection layer (105) and a third pixel electrode (108) located in reflective regions (B); the third surface electrode (104), the reflection layer (105) and the third pixel
(Continued)

electrode (108) are located between the first substrate (102) and the liquid crystal layer (110). The liquid crystal layer (110) in both the transmissive region (A) and the reflective region (B) of the display device have an equal thickness, thereby drastically reducing the process difficulty of the device while guaranteeing the same phase retardations in both transmissive region and reflective region.

14 Claims, 2 Drawing Sheets (51) Int. Cl.
  *G02F 1/1343* (2006.01)
  *G02F 1/139* (2006.01)
(52) U.S. Cl.
  CPC .. *G02F 1/133553* (2013.01); *G02F 1/134363* (2013.01); *G02F 2001/13793* (2013.01)

(56) References Cited

U.S. PATENT DOCUMENTS

| | | | | |
|---|---|---|---|---|
| 8,199,298 | B2* | 6/2012 | Otake | G02F 1/133555 349/114 |
| 2007/0085958 | A1* | 4/2007 | Lin | G02F 1/134363 349/141 |
| 2008/0043185 | A1* | 2/2008 | Jeng | G02F 1/133555 349/114 |
| 2008/0074588 | A1* | 3/2008 | Sekiguchi | G02F 1/133555 349/106 |
| 2009/0201449 | A1* | 8/2009 | Nishida | G02F 1/134363 349/114 |
| 2009/0279027 | A1* | 11/2009 | Nishida | G02F 1/133555 349/114 |
| 2010/0044716 | A1 | 2/2010 | Lo et al. | |
| 2012/0133878 | A1* | 5/2012 | Hirakata | G02F 1/133528 349/141 |
| 2012/0168760 | A1* | 7/2012 | Sun | G02F 1/133555 257/59 |
| 2013/0120680 | A1* | 5/2013 | Sun | G02F 1/1368 349/43 |
| 2015/0323834 | A1* | 11/2015 | Choi | G02F 1/133555 349/96 |

FOREIGN PATENT DOCUMENTS

| | | |
|---|---|---|
| CN | 102809843 A | 12/2012 |
| CN | 102879957 A | 1/2013 |
| CN | 102981325 A | 3/2013 |
| CN | 104020616 A | 9/2014 |

OTHER PUBLICATIONS

Written Opinion of the International Searching Authority dated Mar. 13, 2015; PCT/CN2014/087900.
The Extended European Search Report dated Jan. 25, 2018; Appl No. 14861109.8.

* cited by examiner

TRANSFLECTIVE LIQUID CRYSTAL DISPLAY DEVICE AND DRIVING METHOD THEREOF

TECHNICAL FIELD

Embodiments of the present invention relate to a transflective liquid crystal display device and a driving method thereof.

BACKGROUND

In panel display technology field presently, liquid crystal display devices are dominant due to their advantages of small volume, low power consumption and no irradiation. According to different types of light sources being adopted (internal light source, and external light source), liquid crystal display devices may be classified into transmissive, reflective and transflective types.

Among them, transflective liquid crystal display devices can both utilize light from internal backlight source and light from external environment while displaying pictures, have good visibility of pictures as transmissive display devices and low energy consumption as reflective display devices. It satisfies the requirements for both sufficient external light (e.g., outdoors) and insufficient external light (e.g., indoors), and thus are widely used in portable mobile electronic equipments.

Typically, each pixel unit of a transflective liquid crystal display device comprises a transmissive region and a reflective region, and a reflection structure for reflecting light is provided in the reflective region. Light emitted from the backlight source passes and exits the transmissive region. After entering the liquid crystal display device, the external environment light is reflected by the reflection structure in the reflective region to exit the screen, thereby enabling the user to see the pictures displayed on the screen. However, light emerged from the transmissive region passes the liquid crystal molecular layer only once, while light emerged from the reflective region passes the liquid crystal molecular layer twice. Given the same thickness of liquid crystal layer, the optical path of reflective region is twice the optical path of transmissive region, which results in an optical path difference, and leads to unmatched phase delays of light emerging from transmissive region and reflective region, thereby severely affecting the display effect.

A known method for addressing the above problem is to adopt a double cell thickness structure in which the thickness of liquid crystal layer in the transmissive region is adjusted to be two times the thickness of liquid crystal layer in the reflective region, thereby enabling the phase delays for transmissive region and reflective region to be consistent. However, in order to form a double cell thickness structure, it is required to fabricate an organic insulating layer in the reflective region to lift up liquid crystal layer in the region, moreover, the subsequent rubbing process performed on the alignment layer become very difficult due to the uneven substrate surface, which leads to processing difficulty in manufacturing transflective liquid crystal display devices.

SUMMARY

According to the first aspect of the present invention, there is provided a transflective liquid crystal display device comprising a plurality of pixel units, each pixel unit comprising a transmissive region and a reflective region, the transflective liquid crystal display device comprising a first substrate and a second substrate disposed opposite to each other and a liquid crystal layer disposed between them, wherein a thickness of the liquid crystal layer in both the transmissive region and the reflective region is equal to each other; the transflective liquid crystal display device further comprising: a first surface electrode, a first pixel electrode, a second surface electrode and a second pixel electrode being disposed in the transmissive region, the first surface electrode and the first pixel electrode being disposed between the first substrate and the liquid crystal layer, and the second pixel electrode and the second pixel electrode being disposed between the second substrate and the liquid crystal layer; and a third surface electrode, a reflection layer and a third pixel electrode being disposed in the reflective region, and the third surface electrode, the reflection layer and the third pixel electrode being disposed between the first substrate and the liquid crystal layer.

As an example, the first pixel electrode, the second pixel electrode and the third pixel electrode are strip-shaped electrode.

As an example, the first pixel electrode is located between the first surface electrode and the liquid crystal layer, the second pixel electrode is located between the second surface electrode and the liquid crystal layer, the reflection layer is located between the third surface electrode and the liquid crystal layer, and the third pixel electrode is located between the reflection layer and the liquid crystal layer.

As an example, the first surface electrode and the third surface electrode are connected with each other.

As an example, the first surface electrode and the third surface electrode are of same material and formed in same layer.

As an example, the first surface electrode and the second surface electrode are electrically connected with each other, and the first pixel electrode and the second pixel electrode are electrically connected with each other.

As an example, the third surface electrode and the first surface electrode are electrically connected with each other, and the third pixel electrode and the first pixel electrode are electrically connected with each other.

As an example, wherein liquid crystal in the liquid crystal layer is blue phase liquid crystal.

As an example, the first surface electrode and the first pixel electrode are configured to form a first horizontal electric field, the second surface electrode and the second pixel electrode are configured to form a second horizontal electric field, and the third surface electrode and the third pixel electrode are configured to form a third horizontal electric field.

According to the second aspect of the present invention, there is provided a method for driving the above-mentioned transflective liquid crystal display device, comprising: applying driving voltages to the first surface electrode, the first pixel electrode, the second surface electrode, the second pixel electrode, the third surface electrode and the third pixel electrode to generate a first voltage difference between the first surface electrode and the first pixel electrode, a second voltage difference between the second surface electrode and the second pixel electrode, a third voltage difference between the third surface electrode and the third pixel electrode; and controlling a sum of the first voltage difference and the second voltage difference to be equal to two times the third voltage difference, such that the phase retardations in the transmissive region and the reflective region are equal to each other, or controlling a difference between the sum of first voltage difference and second voltage difference and two times the third voltage difference within a permissible error range for voltage difference, such that a phase retardation difference between the transmissive region and the reflective region is within a permissible error range for phase retardation.

As an example, the controlling the sum of the first voltage difference and the second voltage difference to be two times the third voltage difference comprises: controlling the first voltage difference, the second voltage difference and the third voltage difference to be same as one another.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "includes," "including," "comprises," "comprising," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the position of the object which is described is changed, the relative position relationship may be changed accordingly.

Figure 1:
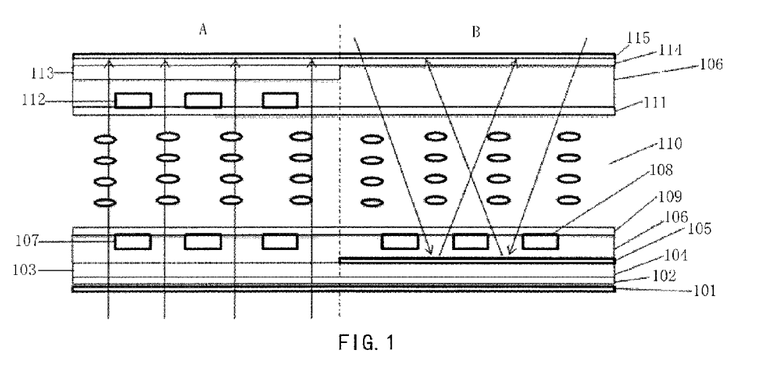
FIG. 1 is a schematic structure diagram of a transflective liquid crystal display device provided in an embodiment of the present invention without any voltage applied.

Embodiments of the present invention provide a transflective liquid crystal display device comprising a plurality of pixel units. As shown in FIG. 1, each pixel unit comprises a transmissive region A and a reflective region B.

The above-mentioned transflective liquid crystal display device comprises a first substrate 102 and a second substrate 114 disposed oppositely and a liquid crystal layer 110 disposed between them.

Liquid crystal layers in transmissive region A and reflective region B have an equal thickness.

The above-mentioned transflective liquid crystal display device further comprises: a first surface electrode 103, a first pixel electrode 107, a second surface electrode 113 and a second pixel electrode 112 disposed in the transmissive region A, wherein the first surface electrode 103 and the first pixel electrode 107 are located between the first substrate 102 and the liquid crystal layer 110, the second surface electrode 113 and the second pixel electrode 112 are located between the second substrate 114 and the liquid crystal layer 110; a third surface electrode 104, a reflection layer 105 and a third pixel electrode 108 disposed in the reflective region B, wherein the third surface electrode 104, the reflection layer 105 and the third pixel electrode 108 are located between the first substrate 102 and the liquid crystal layer 110.

In the transflective liquid crystal display device provided in the present embodiment, liquid crystal layers in transmissive region A and reflective region B have the same thickness. In the transmissive region A, the first surface electrode 103 and the first pixel electrode 107 are disposed on a side of the liquid crystal layer close to the first substrate 102 and form a horizontal electric field parallel to the first substrate 102 so as to rotate liquid crystal molecules of the liquid crystal layer close to the first substrate 102 in the transmissive region A; in this case, the first surface electrode 103 and the first pixel electrode 107 constitute an ADS (Advanced Dimension Switch) mode. In the transmissive region A, the second surface electrode 113 and the second pixel electrode 112 are disposed on a side of the liquid crystal layer close to the second substrate 114 and form a horizontal electric field parallel to the second substrate 114 so as to rotate liquid crystal molecules of the liquid crystal layer close to the second substrate 114 in the transmissive region A; in this case, the second surface electrode 113 and the second pixel electrode 112 also constitute an ADS (Advanced Dimension Switch) mode. In the reflective region B, the third surface electrode 104 and the third pixel electrode 108 are disposed on a side of the liquid crystal layer close to the first substrate 102 and form a horizontal electric field parallel to the first substrate 102 so as to rotate liquid crystal molecules in the reflective region B; in this case, the third surface electrode 104 and the third pixel electrode 108 also constitute an ADS (Advanced Dimension Switch) mode. It is possible to make total birefringence difference in transmissive region A being two times that in the reflective region B by controlling voltages applied onto the respective surface electrodes or pixel electrodes. Since light passes transmissive region A once and passes reflective region B twice, the optical path in transmissive region A is half the optical path in reflective region B. Therefore, phase retardation in transmissive region A is the same as that in reflective region B, thereby satisfying the requirements for display effect.

Since liquid crystal layers in transmissive region A and reflective region B have the same thickness in the above-mentioned transflective liquid crystal display device, it is no need to form an organic insulating layer with a certain thickness on the first substrate and/or the second substrate in the reflective region for the sake of reducing the thickness of liquid crystal layer in reflective region and in turn keeping phase delays in transmissive and reflective region equal to each other. in the transflective liquid crystal display device provided in the present embodiment, the surfaces of both the first substrate 102 and second substrate 114 is relative flat, which avoids the problem of processing difficulty in rubbing the alignment layer due to the uneven surface of first substrate and/or second substrate caused by the presence of organic insulating layer, thereby ensuring the phase delay amounts in transmissive region A and reflective region B to be the same, and at the same time drastically reducing processing difficulty in manufacturing the transflective liquid crystal display device and increasing processing efficiency.

In one example, the first pixel electrode 107, second pixel electrode 112 and third pixel electrode 108 are strip-shaped electrodes, which are used to constitute ADS mode with the first surface electrode 103, second surface electrode 113 and third surface electrode 104, respectively. For example, size and thickness of the first pixel electrode 107, second pixel electrode 112 and third pixel electrode 108 are same as one another, such that the electrode structure of ADS mode constituted by the first pixel electrode 107 and the first surface electrode 103, the electrode structure of ADS mode constituted by the second pixel electrode 112 and the second surface electrode 113, and the electrode structure of ADS mode constituted by the third pixel electrode 108 and the third surface electrode 104 are same as one another, so as to provide a structural basis for simplifying the method of driving the liquid crystal display device.

In the present embodiment, the first pixel electrode 107 is located between the first surface electrode 103 and liquid crystal layer 110, the second pixel electrode 112 is located between the second surface electrode 113 and liquid crystal layer 110, the reflection layer 105 is located between the third surface electrode 104 and liquid crystal layer 110 and the third pixel electrode 108 is located between the reflection layer 105 and liquid crystal layer 110.

It is to be noted that the specific structure of the transflective liquid crystal display device is illustrated by taking the relative position relationship between the above-mentioned pixel electrodes, surface electrodes and reflection layer in the present embodiment as an example. In other embodiments of the present invention, the relative position relationship between first pixel electrode 107 and first surface electrode 103, the relative position relationship between second pixel electrode 112 and second surface electrode 113, and the relative position relationship between third surface electrode 104, reflection layer 105 and third pixel electrode 108 may also have other variants. For example, the reflection layer 105 may also be located between the third surface electrode 104 and the first substrate 102, or between the third pixel electrode 108 and the liquid crystal layer 110.

The present embodiment does not impose any limitation to the materials for forming pixel electrodes and surface electrodes. Specifically, suitable materials may be selected according to practical situations such as transparent conductive materials, e.g. ITO (indium tin oxide), IZO (indium zinc oxide), to enhance electrical conductivity performance of pixel electrodes and surface electrodes.

In one example, the first surface electrode 103 and the third surface electrode 104 are connected with each other. In another example, the first surface electrode 103 and the third surface electrode 104 are of the same material and formed in the same layer, that is, the first surface electrode 103 and the third surface electrode 104 are formed in the same process step and located in the same layer, they are an integral surface electrode; in this way, the first surface electrode 103 and the third surface electrode 104 could be controlled uniformly while driving them, thereby simplifying the driving scheme of the liquid crystal display device.

In order to simplify the controlling of driving voltages applied onto the pixel electrodes and surface electrodes, in one example, the first surface electrode 103 and second surface electrode 113 are electrically connected to each other, so they could be driven uniformly. The first pixel electrode 107 and second pixel electrode 112 are electrically connected to each other, so the voltages could be controlled uniformly, such as both of them is supplied with voltage, or no voltage is supplied, or the voltage is switched.

For example, the electrical connection between first surface electrode 103 and second surface electrode 113 and electrical connection between first pixel electrode 107 and second pixel electrode 112 are achieved in this way: fabricating and directing the driving leads which are connected with first surface electrode 103, second surface electrode 113, first pixel electrode 107 and second pixel electrode 112 respectively to edges of first substrate 102 and second substrate 114; and then connecting the driving leads of respective electrodes on first substrate 102 and second substrate 114 with the dual pins of a COF (chip on film), thereby realizing the electrical connection between first surface electrode 103 and second surface electrode 113 and/or the electrical connection between first pixel electrode 107 and second pixel electrode 112 with robust structure and aesthetic appearance.

In one example, the third surface electrode 104 is electrically connected with the first surface electrode 103, that is, the first surface electrode 103, second surface electrode 113 and third surface electrode 104 are connected with one another; the third pixel electrode 108 is electrically connected with the first pixel electrode 107, that is, the first pixel electrode 107, second pixel electrode 112 and third pixel electrode 108 are connected with one another. Therefore, uniform control of the first surface electrode 103, second surface electrode 113 and third surface electrode 104 and uniform control of the first pixel electrode 107, second pixel electrode 112 and third pixel electrode 108 are realized, which simplifies the driving scheme of the transflective liquid crystal display device provided in the present embodiment.

In one example, the reflection layer 105 in reflective region B is formed of a material with high reflection coefficient such as metals, e.g., aluminum and silver, or metal alloys or metal oxides.

In one example, the transflective liquid crystal display device further comprises insulating layers 106 formed between the first surface electrode 103 and first pixel electrode 107, between the second surface electrode 113 and second pixel electrode 112, and between the third surface electrode 104 and third pixel electrode 108. The insulating layers 106 are formed of transparent insulating materials such as resin. The insulating layers 106 spread throughout the space between the first surface electrode 103 and first pixel electrode 107, the space between the second surface electrode 113 and second pixel electrode 112, and the space between the third surface electrode 104 and third pixel electrode 108, such that the electric fields of ADS mode with good electrical performance can be generated between the first surface electrode 103 and first pixel electrode 107, between the second surface electrode 113 and second pixel electrode 112, and between the third surface electrode 104 and third pixel electrode 108.

In one example, in case that the liquid crystal layer is constituted of conventional liquid crystal molecules, the transflective liquid crystal display device provided in the present embodiment further comprises: a first alignment layer 109 and a second alignment layer 111 located on both sides of the liquid crystal layer 110. The first alignment layer 109 is located on a side of the liquid crystal layer 110 that is close to the first substrate 102, the second alignment layer 111 is located on a side of the liquid crystal layer 110 that is close to the second substrate 114, and the first alignment layer 109 has an alignment direction perpendicular to that of the second alignment layer 111 to initially align the liquid crystal molecules.

Furthermore, in one example, the transflective liquid crystal display device further comprises: a first polarizer 101 laminated on the first substrate 102 and a second polarizer 115 laminated on the second substrate 114, the first and second polarizer 110, 115 have polarization axes perpendicular to each other, such that the light passing through the first polarizer 101 becomes linearly polarized light when entering the liquid crystal display, and then passes through the second polarizer 115 to become circularly polarized light when leaving the liquid crystal display.

Figure 3:
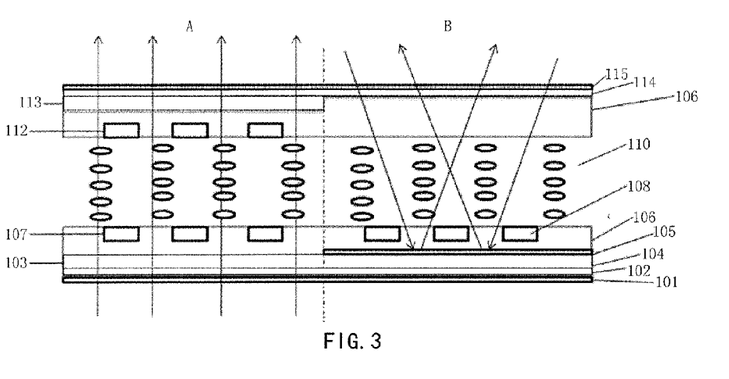
FIG. 3 is a schematic structure diagram of another transflective liquid crystal display device provided in an embodiment of the present invention without any voltage applied.

In one example, liquid crystal molecules in the liquid crystal layer 110 are blue phase liquid crystals. In this case, it is no need to dispose any alignment layers on both sides of the liquid crystal layer 110. For example, as shown in FIG. 3, the transflective liquid crystal display device using blue phase liquid crystals does not comprise the first alignment layer 109 and second alignment layer 111 shown in FIG. 1, but comprises other component or structure same as those in FIG. 1, which will not be described in detail here.

As compared to conventional liquid crystals, blue phase liquid crystals have a response time on the order of sub-millisecond, which endows the transflective liquid crystal display device with a fast response speed. Blue phase liquid crystals are optically isotropic, therefore it is no need to align them by the alignment layer, which further simplifies the manufacturing process of the liquid crystal display device. Moreover, since the blue phase liquid crystals are optically isotropic in dark field, the liquid crystal display device has a wide viewing angle and is symmetric.

In one example, the first substrate 102 of the transflective liquid crystal display device is an array substrate, and the second substrate 114 is a color filter substrate, or, the first substrate 102 is a color filter substrate and the second substrate is an array substrate.

The array substrate comprises, for example: a plurality of data lines in the first direction and a plurality of gate lines in the second direction, wherein the first direction and the second direction are perpendicular to each other, such that the data lines intersect the gate lines to form a mesh structure so as to define a plurality of pixel unit regions arranged in an array. A thin film transistor is provided at each of intersections between the plurality of data lines and the plurality of gate lines, which has a gate connected with a gate line, a source connected with a data line, and a drain connected with a pixel electrode in the same pixel unit region and configured to switch on or off the pixel unit.

The color filter substrate comprises, for example: a mesh-like black matrix. The mesh determined by the black matrix corresponds to the mesh formed by data lines and gate lines one to one, so as to block leads on the array substrate such as thin film transistors, gate lines and data lines. Color filter is filled in each grid delimited by the black matrix which is in a one-to-one correspondence with pixel electrodes on the array substrate. The color filter comprises at least one of for example red color filter, blue color filter and green color filter, such that light passing through liquid crystal layer 110 of the liquid crystal display device displays different colors after further penetrating color filter.

An embodiment of the present invention further provides a method for driving a transflective liquid crystal display device, for example, applied to the above-mentioned transflective liquid crystal display device. The driving method comprises: applying driving voltages to the first surface electrode 103, first pixel electrode 107, second surface electrode 113, second pixel electrode 112, third surface electrode 104 and third pixel electrode 108 to generate a first voltage difference between first surface electrode 103 and first pixel electrode 107, a second voltage difference between second surface electrode 113 and second pixel electrode 112, a third voltage difference between third surface electrode 104 and third pixel electrode 108; and controlling the sum of first voltage difference and second voltage difference to be equal to two times the third voltage difference, such that the phase retardations in transmissive region A and reflective region B are equal to each other; alternatively, controlling a difference between the sum of first voltage difference and second voltage difference and two times the third voltage difference within a permissible error range for voltage difference, such that a phase retardation difference between transmissive region A and reflective region B is within a permissible error range for phase retardation.

Figure 2:
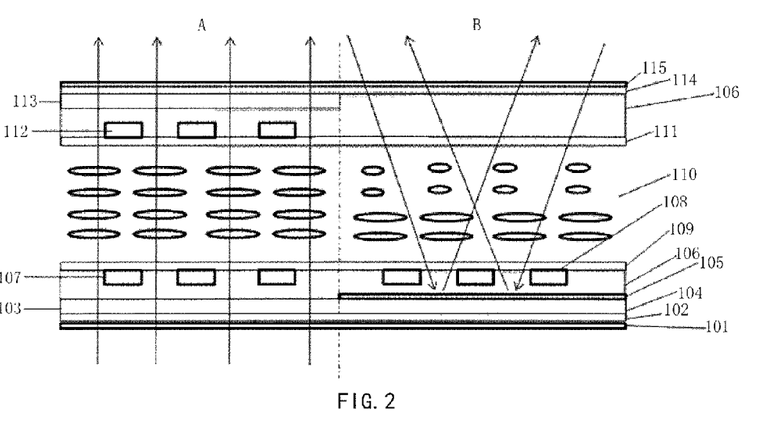
FIG. 2 is a schematic structure diagram of a transflective liquid crystal display device provided in an embodiment of the present invention with a voltage applied.

In the above-mentioned driving method, the first voltage difference, second voltage difference, and third voltage difference rotate liquid crystal molecules respectively, and generate different birefringence differences; the magnitude of a voltage difference is in a linear relationship with the birefringence difference. Since the sum of first voltage difference and second voltage difference is controlled to be two times or approximately two times the third voltage difference, the birefringence difference in transmissive region A is two times or approximately two times the birefringence difference in reflective region B. Further, the light propagation path in transmissive region A is: entering liquid crystal display device from the first substrate 102, penetrating through liquid crystal layer 110, and emerging from the second substrate 114; while the light propagation path in reflective region B is: entering the second substrate 114, penetrating through liquid crystal layer 110, penetrating liquid crystal layer 110 again after being reflected by the reflection layer 105, and emerging from the second substrate 114; thus, the optical path in transmissive region A is two times the optical path in reflective region B (as shown in FIG. 2). According to the fact that the product of birefringence difference and optical path is the phase retardation, the phase retardation in transmissive region A is same or approximately same as the phase retardation in the reflective region B, thus, the display effect can be increased.

It is to be noted that each of the film layers formed on either first substrate 102 or second substrate 114 (i.e., the layers that are passed through by light in its propagation, such as insulating layer 106, first surface electrode 103, first pixel electrode 107, first alignment layer 109, second alignment layer 111, second pixel electrode 112, second surface electrode 113 and third pixel electrode 108) has relative small thickness with respect to liquid crystal layer 110, therefore the propagation distance of light when passing through these layers on the substrate may be neglected. The optical path of light in transmissive region A as mentioned in the present embodiment may be approximately considered as the thickness of liquid crystal layer 110, and the optical path of light in reflective region B may be approximately considered as two times thickness of liquid crystal layer 110.

Hereinbelow, two examples are provided for the two respective driving schemes: one is to control the sum of first voltage difference and second voltage difference to be equal to two times the third voltage difference, such that the phase delay amounts in transmissive region A and reflective region B are equal to each other; and the another one is to control a difference between the sum of first voltage difference and second voltage difference and two times the third voltage difference within a permissible error range for voltage difference, such that a phase retardation difference between transmissive region A and reflective region B is within a permissible error range for phase retardation.

Figure 4:
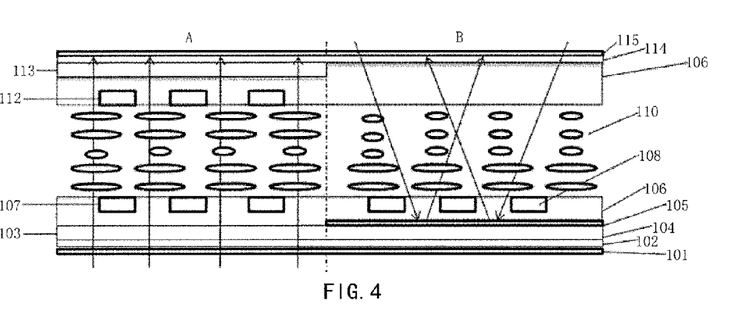
FIG. 4 is a schematic structure diagram of another transflective liquid crystal display device provided in an embodiment of the present invention with a voltage applied.

In one example, in order to control the sum of first voltage difference and second voltage difference to be equal to two times the third voltage difference, it is possible to control the first voltage difference, second voltage difference and third voltage difference to be same as one another, such that the intensity and distribution of electric fields at peripherals of all pixel electrodes (including first pixel electrode 107, second pixel electrode 112 and third pixel electrode 108) are consistent, the liquid crystal rotation degree and birefringence difference caused by Kerr effect are consistent, as shown in FIG. 2 (while a transflective liquid crystal display device adopting blue phase liquid crystals is driven using the above-mentioned method, the intensity and distribution of electric fields at peripherals of each pixel electrode are consistent, the rotation degree and birefringence difference of liquid crystal are also consistent, as shown in FIG. 4). The liquid crystal birefringence difference caused by each pixel electrode is defined as $\Delta n$, the thickness of liquid crystal layer affected by each pixel electrode is defined as d, the phase retardation is defined as $\delta$, then $\delta = \Delta n \times d$, thus, the phase retardation for the transmitted light in transmissive region A is: $\delta_T = 2\Delta n \times d$, the phase retardation for the reflected light in reflective region B is: $\delta_F = \Delta n \times 2d$. Therefore, $\delta_T = \delta_F$, that is, the phase retardations in transmissive region A and reflective region B are same as each other.

For example, it is possible to apply same driving voltage on both first surface electrode 103 and second surface electrode 113, and apply same driving voltage on both first pixel electrode 107 and second pixel electrode 112, such that the first voltage difference and the second voltage difference are the same. In terms of structure, it is possible to connect the first surface electrode 103 with the second surface electrode 113, so as to uniform control the voltage applied thereon; and it is also possible to connect the first pixel electrode 107 with the second pixel electrode 112, so as to uniform control the voltage applied thereon. In this way, the electrodes can be controlled conveniently and the difficulty in designing a driving scheme can be reduced.

Furthermore, it is possible to apply same driving voltage on both first surface electrode 103 and third surface electrode 104, and apply same driving voltage on both first pixel electrode 107 and third pixel electrode 108, such that the first voltage difference and the third voltage difference are the same, and in turn the first, second, and third voltage difference are same as one another. In terms of structure, it is possible to connect the first surface electrode 103, the second surface electrode 113 and the third surface electrode 104 together, so as to uniform control the voltage applied thereon; and it is also possible to connect the first pixel electrode 107, the second pixel electrode 112, and the third pixel electrode 108 together, so as to uniform control the voltage applied thereon. In this way, the electrodes can be controlled conveniently and the difficulty in designing a driving scheme can be reduced. Since two identical electric fields of ADS mode are formed in the transmissive region A, and one electric field of ADS mode is formed in the reflective region B, this structure enables the first surface electrode 103 and second surface electrode 113 in transmissive region A and the third surface electrode 104 in reflective region B to be controlled uniformly, and enables the first pixel electrode 107 and second pixel electrode 112 in transmissive region A and the third pixel electrode 108 in reflective region B to be controlled uniformly, thereby achieving the purpose of same phase retardations in transmissive region A and reflective region B. This driving method has the advantage of simpler design in comparison with the driving method in which driving voltages for transmissive region and reflective region are separately controlled for realizing the same phase retardation for the transflective liquid crystal display device with the liquid crystal layers in transmissive region and reflective region having the same thickness.

For example, while forming the first surface electrode 103 and the third surface electrode 104, it is possible to form a whole piece of electrode, that is, the first surface electrode 103 and the third surface electrode 104 are formed as an integrated structure, thereby omitting the step of patterning the electrode layer to form first surface electrode 103 and third surface electrode 104, thereby simplifying the manufacturing process.

In one example, in order to control the difference between the sum of first voltage difference and second voltage difference and two times the third voltage difference to be within a permissible error range, it is possible to control the first voltage difference and the second voltage difference to be the same as each other, and control the difference between first voltage difference and third voltage difference to be within a permissible error range for voltage difference. At this time, the difference between the third voltage difference and the first voltage difference (second voltage difference) is extremely small, which means they are approximately equal to each other, and the phase retardation difference between the transmissive region A and reflective region B is extremely small, which means they are approximately equal to each other; thus, the adverse impact on display effect is extreme little, and it is difficult to be visually observed by the user.

It is to be noted that the permissible error range for phase retardation refers to a specific range determined by the degree of impacting on the display effect due to the phase retardation difference between transmissive region A and reflective region B; in the specific range, the light transmissivity of light in transmissive region A and reflective region B are the same or almost the same. The relationship curves of light transmissivity in transmissive region A and reflective region B versus voltage difference is measured in advance, as a result, in the permissible error range for phase retardation, the relationship curves of light transmissivity in transmissive region A and reflective region B versus voltage difference coincide or almost coincide, and display effect of the device is the same as the display effect while the phase retardations in transmissive region A and reflective region B are equal to each other.

The permissible error range for voltage difference refers to a range of difference between the sum of first and second voltage difference and two times the third voltage difference corresponding to the above determined permissible error range for phase retardation; when the difference between the sum of first and second voltage difference and two times the third voltage difference is controlled to vary within this range, the phase delay retardations in transmissive region A and reflective region B are approximately equal to each other.

Based on the method of driving the liquid crystal display device by controlling the first voltage difference and second voltage difference to be the same and controlling the difference between the first voltage difference and the third voltage difference to be within a permissible error range for voltage difference, in an implementation, it is possible to apply same driving voltages on both first surface electrode 103 and second surface electrode 113 and apply same driving voltage on both first pixel electrode 107 and second pixel electrode 112, thereby making the first voltage difference and second voltage difference equal to each other. In terms of structure, it is possible to connect first surface electrode 103 with the second surface electrode 113, so as to uniform control the voltage applied thereon, and connect the first pixel electrode 107 with the second pixel electrode 112, so as to uniform control the voltage applied thereon. In this way, the electrodes can be controlled conveniently and the difficulty in designing a driving scheme can be reduced.

Furthermore, it is possible to apply same driving voltage on both first surface electrode 103 (second surface electrode 113) and third surface electrode 104, and control the driving voltage difference between the first pixel electrode 107 (second pixel electrode 112) and third pixel electrode 108 to be within the permissible error range for voltage difference. In terms of structure, it is possible to connect the first surface electrode 103, the second surface electrode 113 and the third surface electrode 104 together, so as to uniform control the voltage applied thereon; it is also possible to connect the first pixel electrode 107 with the second pixel electrode 112, so as to uniform control the voltage applied thereon; the voltage applied on the third pixel electrode 108 is controlled individually. In this way, the electrodes can be controlled conveniently, the difficulty in designing a driving scheme can be reduced, and at the same time, the driving voltages applied on both the third pixel electrode 108 and the first pixel electrode 107 (the second pixel electrode 112) can be controlled in a larger range.

For example, while forming the first surface electrode 103 and the third surface electrode 104, it is possible to form a whole piece of electrode, that is, the first surface electrode 103 and the third surface electrode 104 are formed as an integrated structure, thereby omitting the step of patterning the electrode layer to form first surface electrode 103 and third surface electrode 104, thereby further simplifying the manufacturing process.

In the transflective liquid crystal display device and the driving method thereof provided in embodiments of the present invention, liquid crystal layers in transmissive region and reflective region have the same thickness; a surface electrode and a pixel electrode are disposed on both sides of the liquid crystal layer in transmissive region, thus, the electric fields parallel to the substrate are generated on both sides of the liquid crystal layer, whereas a surface electrode and a pixel electrode are merely disposed on one of sides of liquid crystal layer in reflective region, thus an electric field parallel to the substrate is generated on only one of sides of the liquid crystal layer in reflective region. Applying appropriate driving voltages can make voltage difference between pixel electrodes and surface electrodes in transmissive region and reflective region consistent or substantially consistent, thereby making liquid crystal birefringence difference or the thickness of liquid crystal affected by each electric field consistent or substantially consistent. Since the transmissive region has two electric fields parallel to the substrate and light passes the transmissive region only once, and the reflective region has one electric field parallel to the substrate and light passes the reflective region twice, light ultimately emerging from the transmissive region and reflective region has the same or substantially the same phase retardation, thereby satisfying requirements for display effect. Since transmissive region and reflective region of the above-mentioned transflective liquid crystal display device has the same liquid crystal layer thickness and the substrate surface is flat, the fabrication of the organic insulating layer required in dual cell thickness structure can be omitted, and in turn the problem of increased difficulty of rubbing process for alignment layers due to the uneven substrate surface caused by the presence of organic insulating layer is avoided, thereby drastically reducing the processing difficulty in manufacturing transflective liquid crystal display device while guaranteeing the same phase retardation for transmissive region and reflective region.

What is described above is related to the illustrative embodiments of the disclosure only and not limitative to the scope of the disclosure; the scopes of the disclosure are defined by the accompanying claims.

The present application based on and claims the priority of China Patent application No. 201410246005.2 filed on Jun. 4, 2014, the disclosure of which is incorporated herein in its entirety by reference.

The invention claimed is:

1. A transflective liquid crystal display device, comprising a plurality of pixel units, each pixel unit comprising a transmissive region and a reflective region, the transflective liquid crystal display device comprising a first substrate and a second substrate disposed opposite to each other and a liquid crystal layer disposed between them, wherein a thickness of the liquid crystal layer in both the transmissive region and the reflective region is equal to each other;

the transflective liquid crystal display device further comprising:
a first surface electrode, a first pixel electrode, a second surface electrode and a second pixel electrode being disposed in the transmissive region, the first surface electrode and the first pixel electrode being disposed between the first substrate and the liquid crystal layer, and the second surface electrode and the second pixel electrode being disposed between the second substrate and the liquid crystal layer; and
a third surface electrode, a reflection layer and a third pixel electrode being disposed in the reflective region, and the third surface electrode, the reflection layer and the third pixel electrode being disposed between the first substrate and the liquid crystal layer;
wherein no electrode is disposed between the second substrate and the liquid crystal layer in the reflective region, and no transparent electrode is disposed between the third surface electrode and the third pixel electrode in the reflective region.

2. The transflective liquid crystal display device of claim 1, wherein the first pixel electrode, the second pixel electrode and the third pixel electrode are strip-shaped electrode.

3. The transflective liquid crystal display device of claim 1, wherein the first pixel electrode is located between the first surface electrode and the liquid crystal layer, the second pixel electrode is located between the second surface electrode and the liquid crystal layer, the reflection layer is located between the third surface electrode and the liquid crystal layer, and the third pixel electrode is located between the reflection layer and the liquid crystal layer.

4. The transflective liquid crystal display device of claim 1, wherein the first surface electrode and the third surface electrode are connected with each other.

5. The transflective liquid crystal display device of claim 4, wherein the first surface electrode and the third surface electrode are of same material and formed in same layer.

6. The transflective liquid crystal display device of claim 1, wherein the first surface electrode and the second surface electrode are electrically connected with each other, and the first pixel electrode and the second pixel electrode are electrically connected with each other.

7. The transflective liquid crystal display device of claim 6, wherein the third surface electrode and the first surface electrode are electrically connected with each other, and the third pixel electrode and the first pixel electrode are electrically connected with each other.

8. The transflective liquid crystal display device of claim 1, wherein liquid crystal in the liquid crystal layer is blue phase liquid crystal.

9. The transflective liquid crystal display device of claim 1, wherein the first surface electrode and the first pixel electrode are configured to form a first horizontal electric field, the second surface electrode and the second pixel electrode are configured to form a second horizontal electric field, and the third surface electrode and the third pixel electrode are configured to form a third horizontal electric field.

10. A method for driving the transflective liquid crystal display device of claim 1, comprising:
applying driving voltages to the first surface electrode, the first pixel electrode, the second surface electrode, the second pixel electrode, the third surface electrode and the third pixel electrode to generate a first voltage difference between the first surface electrode and the first pixel electrode, a second voltage difference between the second surface electrode and the second pixel electrode, a third voltage difference between the third surface electrode and the third pixel electrode; and
controlling a sum of the first voltage difference and the second voltage difference to be equal to two times the third voltage difference, such that the phase retardations in the transmissive region and the reflective region are equal to each other, or controlling a difference between the sum of first voltage difference and second voltage difference and two times the third voltage difference within a permissible error range for voltage difference, such that a phase retardation difference between the transmissive region and the reflective region is within a permissible error range for phase retardation.

11. The driving method of claim 10, wherein controlling the sum of the first voltage difference and the second voltage difference to be two times the third voltage difference comprises:
controlling the first voltage difference, the second voltage difference and the third voltage difference to be same as one another.

12. The transflective liquid crystal display device of claim 1, wherein the first pixel electrode is located between the first surface electrode and the liquid crystal layer, the second pixel electrode is located between the second surface electrode and the liquid crystal layer, the reflection layer is located between the third surface electrode and the liquid crystal layer, and the third pixel electrode is located between the reflection layer and the liquid crystal layer.

13. A transflective liquid crystal display device, comprising a plurality of pixel units, each pixel unit comprising a transmissive region and a reflective region, the transflective liquid crystal display device comprising a first substrate and a second substrate disposed opposite to each other and a liquid crystal layer disposed between them, wherein a thickness of the liquid crystal layer in both the transmissive region and the reflective region is equal to each other;
the transflective liquid crystal display device further comprising:
a first surface electrode, a first pixel electrode, a second surface electrode and a second pixel electrode being disposed in the transmissive region, the first surface electrode and the first pixel electrode being disposed between the first substrate and the liquid crystal layer, and the second surface electrode and the second pixel electrode being disposed between the second substrate and the liquid crystal layer; and
a third surface electrode, a reflection layer and a third pixel electrode being disposed in the reflective region, and the third surface electrode, the reflection layer and the third pixel electrode being disposed between the first substrate and the liquid crystal layer;
wherein the first surface electrode and the second surface electrode each cover the transmissive region in a plate form, and the third surface electrode cover the reflective region in a plate form,
wherein no electrode is disposed between the second substrate and the liquid crystal layer in the reflective region, and no transparent electrode is disposed between the third surface electrode and the third pixel electrode in the reflective region.

14. A transflective liquid crystal display device, comprising a plurality of pixel units, each pixel unit comprising a transmissive region and a reflective region, the transflective liquid crystal display device comprising a first substrate and a second substrate disposed opposite to each other and a liquid crystal layer disposed between them, wherein a thickness of the liquid crystal layer in both the transmissive region and the reflective region is equal to each other;
the transflective liquid crystal display device further comprising:
a first surface electrode, a first pixel electrode, a second surface electrode and a second pixel electrode being disposed in the transmissive region, the first surface electrode and the first pixel electrode being disposed between the first substrate and the liquid crystal layer, and the second surface electrode and the second pixel electrode being disposed between the second substrate and the liquid crystal layer; and
a third surface electrode, a reflection layer and a third pixel electrode being disposed in the reflective region, and the third surface electrode, the reflection layer and the third pixel electrode being disposed between the first substrate and the liquid crystal layer;
wherein a sum of a first voltage difference between the first surface electrode and the first pixel electrode and a second voltage difference between the second surface electrode and the second pixel electrode is adapted to be equal to two times a third voltage difference between the third surface electrode and the third pixel electrode, such that phase retardations in the transmissive region and the reflective region are equal to each other,
wherein no electrode is disposed between the second substrate and the liquid crystal layer in the reflective region, and no transparent electrode is disposed between the third surface electrode and the third pixel electrode in the reflective region.

* * * * *